Figure 8:
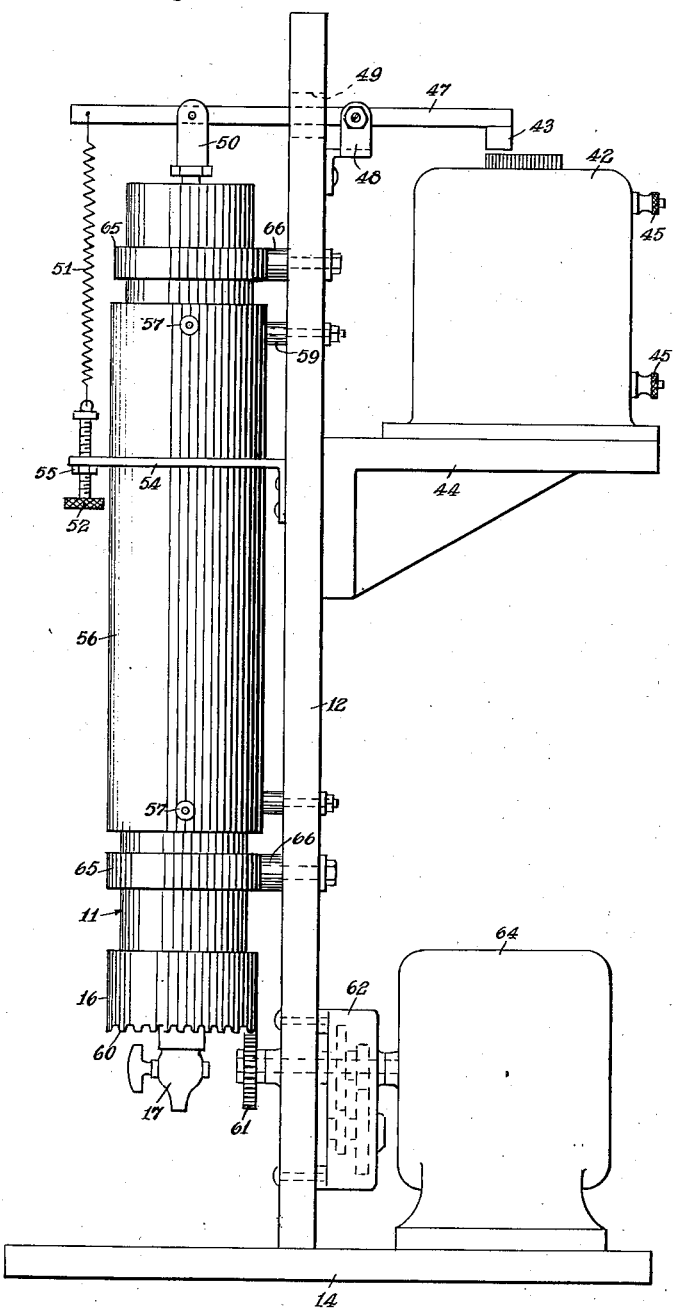

April 26, 1938.  S. J. WYNN  2,115,056
APPARATUS FOR PRODUCING SUSPENSIONS
Original Filed June 19, 1934   4 Sheets-Sheet 1
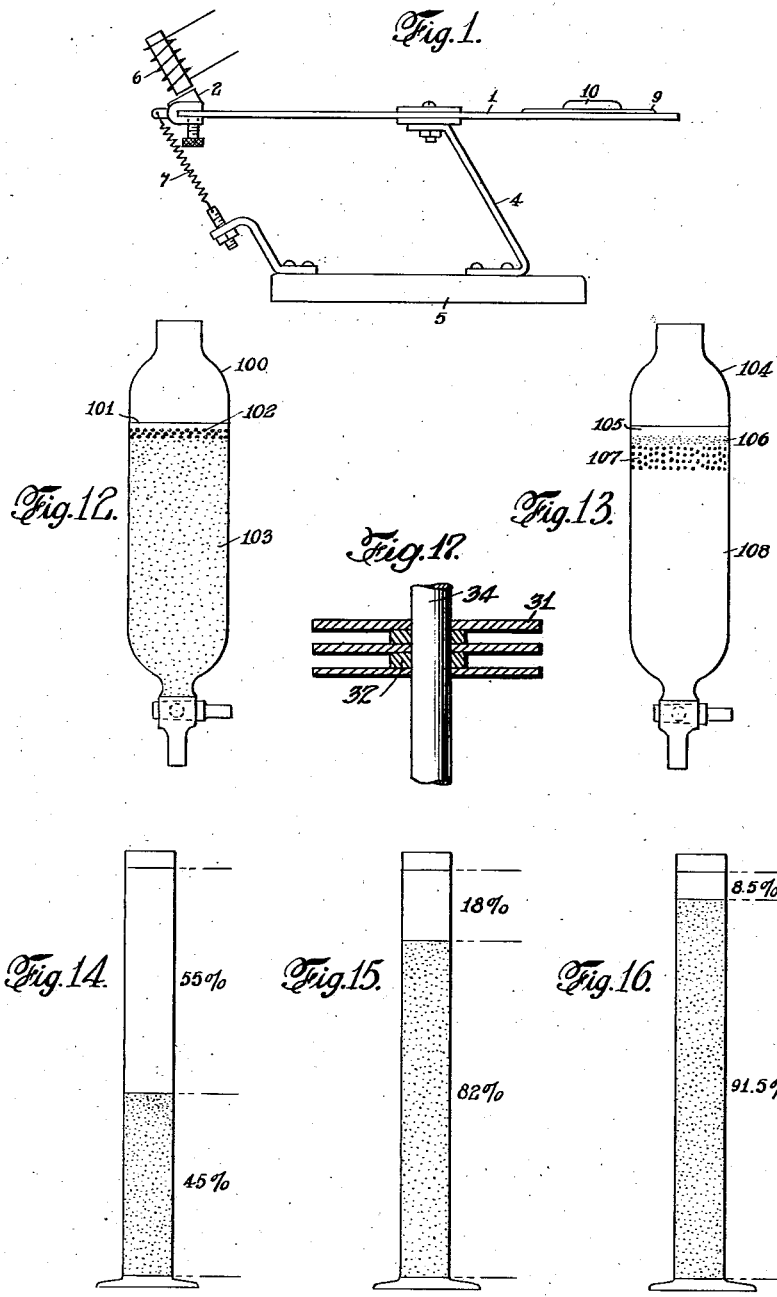

April 26, 1938.  S. J. WYNN  2,115,056
APPARATUS FOR PRODUCING SUSPENSIONS
Original Filed June 19, 1934  4 Sheets-Sheet 2
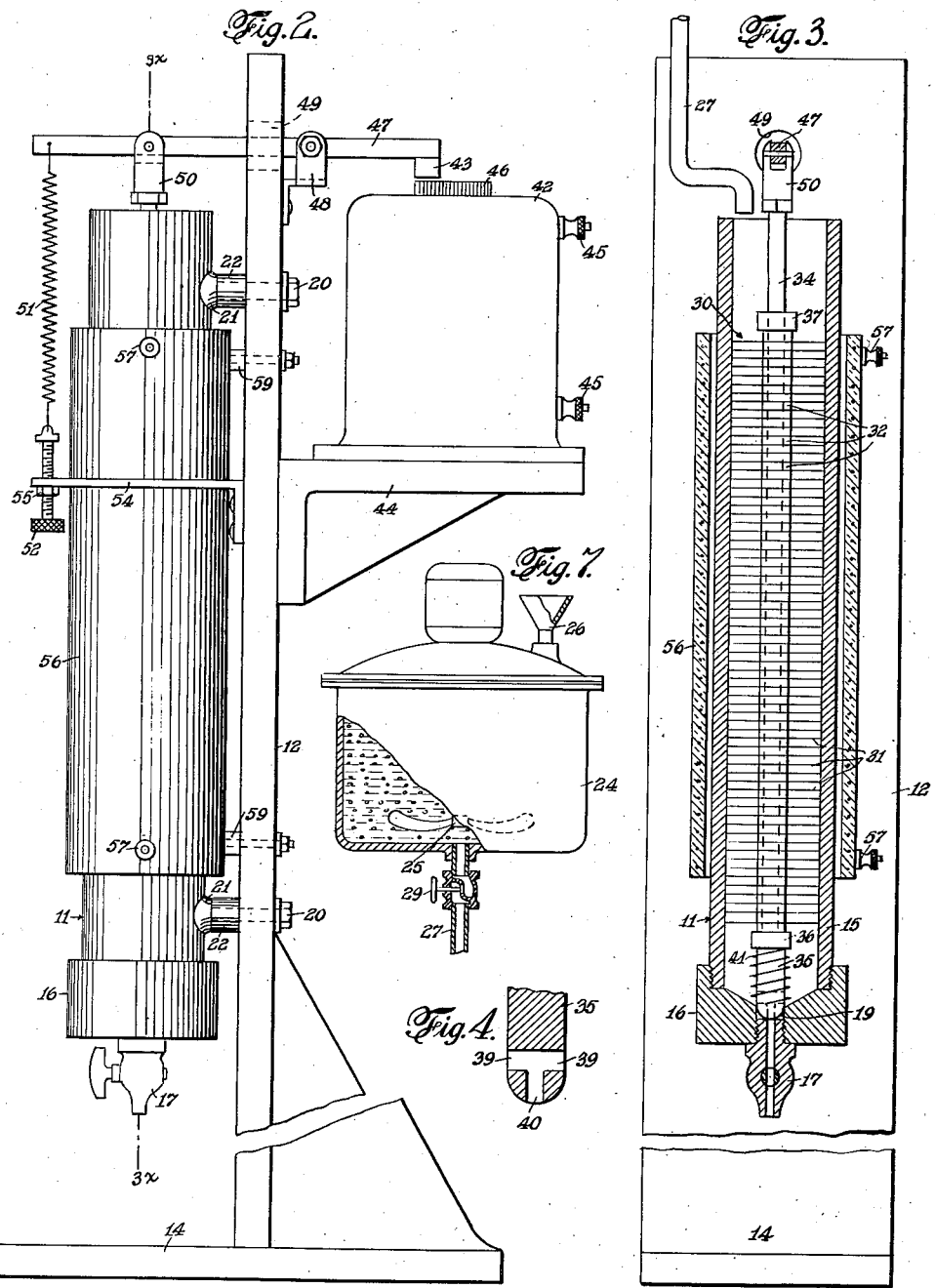
INVENTOR.
Samuel Joseph Wynn
BY
Williams, Rich & Morse
ATTORNEYS April 26, 1938.  S. J. WYNN  2,115,056
APPARATUS FOR PRODUCING SUSPENSIONS
Original Filed June 19, 1934  4 Sheets-Sheet 3

INVENTOR.
Samuel Joseph Wynn
BY
Williams, Rich & Morse,
ATTORNEYS

April 26, 1938.  S. J. WYNN  2,115,056
APPARATUS FOR PRODUCING SUSPENSIONS
Original Filed June 19, 1934  4 Sheets-Sheet 4
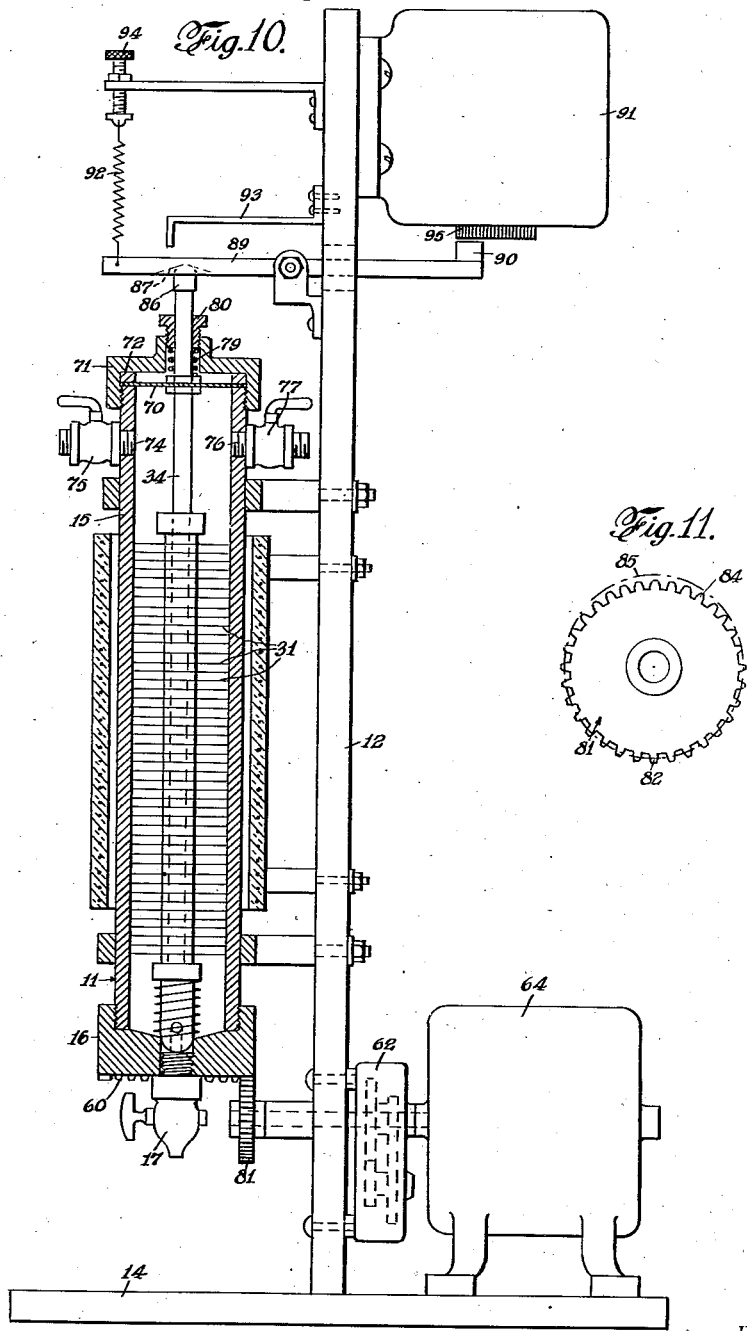
INVENTOR.
Samuel Joseph Wynn
BY
Williams, Rich & Morse
ATTORNEYS Patented Apr. 26, 1938

2,115,056

UNITED STATES PATENT OFFICE 2,115,056

APPARATUS FOR PRODUCING SUSPENSIONS

Samuel Joseph Wynn, New York, N. Y., assignor to Colloid Corporation, Baltimore, Md., a corporation of Maryland Original application June 19, 1934, Serial No. 731,390. Divided and this application June 28, 1935, Serial No. 28,848

13 Claims. (Cl. 259—27)

This application is a division of application Serial No. 731,390, filed June 19, 1934.

The present invention relates to novel apparatus for producing suspensions, it being understood that the term "suspension" as used herein should be taken to mean a composition of matter comprising subdivided particles or micells of one or more substances in one or more other substances, which subdivided particles or micells are larger than molecular in size and either colloidal or larger than colloidal in size.

The general object of the invention is to provide apparatus for producing suspensions, which will effect extremely fine subdivision of the matter to be dispersed in the outer phase.

Certain types of suspensions and particularly emulsions, as made by existing methods, have lacked one most desirable property. They cannot be diluted to any useful extent. That is, material of the outer phase or of the character of the outer phase cannot be added to produce dilution in the proportions often desired. This limitation is necessitated by the very nature of these suspensions. The protective colloid or peptizing agent required by current methods is generally soluble in the material required for dilution or may be peptized by such material with the result that, if dilution is carried beyond a certain limit, a breakdown or separation of phases takes place. Obviously, other means of securing stability must be sought if it is desired to adjust the ratio of inner to outer phases of such suspensions subsequently to their preparation. One such means would be to so reduce particle size of the inner phase that Brownian motion and the forces of surface energy may supplant entirely or in part the function of protective colloids or peptizing agents in achieving to a practical degree both stability and dilution.

By the apparatus of the invention it is possible to produce suspensions characterized by their freedom or substantial freedom from protective colloids or agents effecting or promoting dispersion, depending for stability upon extreme minuteness of the suspended particles. These suspensions are thus capable of dilution or naturally diffusible in the material of the outer phase or material of the character constituting the outer phase. Moreover, when of the oil-in-water type, they may be concentrated by distillation under reduced pressure. Still another advantage resides in the fact that, when the suspended particles are not all of colloidal character, protective colloids or dispersion promoting agents may be employed subsequent to actual production in the apparatus.

Figure 9:
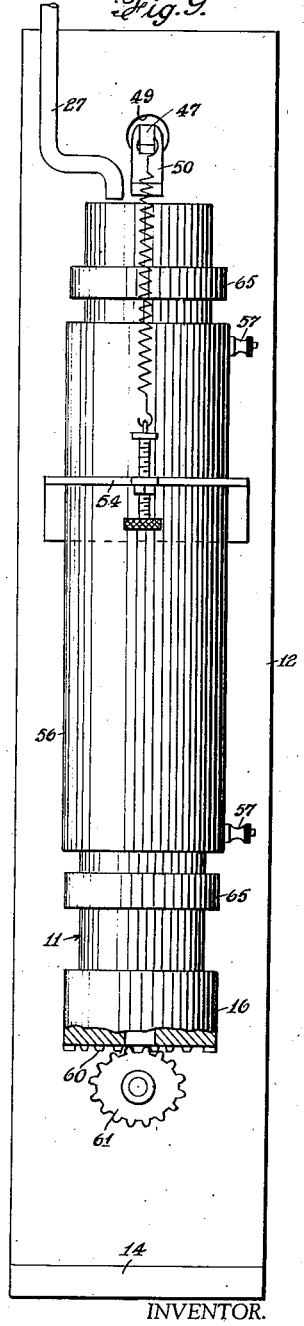

The invention will be understood with the aid of the following description taken in connection with the accompanying drawings in which Fig. 1 is a schematic illustration of a device for demonstrating the effects of the treatment; Fig. 2 is a profile view of an apparatus embodying the invention and constructed for commercial use; Fig. 3 is a longitudinal cross-sectional view taken on the plane indicated by the line 3×—3× in Fig. 2; Fig. 4 is an enlarged detail view, in cross-section, of the lower end of the plunger; Figs. 5 and 6 are plan views of two different forms of vibrating elements; Fig. 7 is a view, on a reduced scale, of an agitating device for effecting preliminary mixing; Figs. 8 and 9 are, respectively, profile and front views of another embodiment constructed for commercial use; Fig. 10 is a view of still another embodiment constructed for commercial use; Fig. 11 is an enlarged detail view of the container-actuating gear employed in the apparatus shown in Fig. 10; Figs. 12 and 13 are illustrative of standing tests performed with oil-in-water mixtures; Figs. 14, 15 and 16 are illustrative of standing tests performed with magnesium hydroxide suspensions; Fig. 17 illustrates a portion of the vibrating member showing certain parts in cross section.

I have made the important discovery that, when two contacting substances are subjected to impactive energy mechanically delivered thereto through vibrating elements, one will be thrown into an extremely fine state of dispersion into the other, provided, of course, the substances are of such nature as to permit their admixture in this manner. This phenomenon may be readily observed with the aid of the device shown in Fig. 1. Referring to this figure, the numeral 1 indicates a plate of vibratile material which carries an adjustable armature 2 at one end and is secured by a flexible member 4 to a base 5. An iron-core electromagnet 6 is operatively associated with the armature 2 in such a manner that successive impacts between armature and core will take place when alternating current is passed through its coil. To assist retraction, an adjustable-tension spring 7 may be employed as shown. A film of oil 9 is evenly spread over the upper surface of the plate 1 and, while the impacts are being delivered, a small quantity of pure distilled water 10 deposited upon the oil film soon becomes cloudy in appearance, showing that a dispersion of some of the oil into the water has taken place. Suspensions created in this manner, after mechanical separation such as vacuum filtration through tight paper, exhibit true colloidal properties. For example, a Tyndall light cone can be formed therein by using a proper lens and light source. Also, a microscopic inspection with direct illumination will show an absolutely clear field up to 900 diameters, but with a dark field condenser at open diaphragm position will show a few particles with the field exhibiting luminescence. In the ultra-microscope a profuse dispersion of particles in active Brownian movement is found with the particle sizes ranging from $0.2\mu$ downward to limits of visibility in such device. Such suspensions can be diluted to any desired extent. Dilution of a given specimen into optically clear distilled water to the extent of 2 parts of specimen to 1,000,000 parts of water will still produce a definite light cone, whereas none is in evidence in the water prior to admixture of the specimen therewith.

It now becomes apparent that the disruptive effect produced in matter by the impactive treatment described may be employed to create suspensions of a colloidal character. Matter in either liquid form or in solid particle form may be dispersed into a liquid phase with great effectiveness and without the assistance of either protective colloids or peptizing substances. In fact, the presence of certain colloids, certain gums for example, inhibits the dispersion or lessens the effectiveness of the treatment.

In each of the embodiments of the invention which will be presently described, the impactive energy required for carrying out the treatment is derived from the successive impacts of an armature upon an iron-core electromagnet energized by alternating current and is communicated to the substances to undergo treatment through a system of spaced vibrating elements immersed therein.

Referring to Figs. 2 and 3, an elongated container 11 is provided for containing the bodies to undergo treatment, it being held in a vertical position by an upright panel 12 having a base 14. It may be conveniently formed by a pipe 15 and bottom cap 16 screw-threaded to one another, both pipe and cap being of massive construction. A drain-cock 17 of standard construction is screw-threaded into a central opening 19 formed through the bottom piece 16 and serves to draw off the treated contents. Any suitable means may be used for attaching the container 11 to the panel 12 and in the embodiment illustrated bolts 20 are screw-threaded into bosses 21 formed on the pipe 15, collars 22 providing the proper spacing between container and panel. The bodies may, if desired, be directly poured into the container 11 at its top, but they should preferably be introduced in a state of preliminary admixture, which may be effected in any well known manner. Thus in Fig. 7 a container 24 is shown, wherein the bodies may be caused to undergo preliminary agitation by a motor-driven propeller 25, a funnel 26 being provided for introducing the bodies therein. A pipe or conduit 27 leads from the container 24 to the top of the container 11, a valve 29 being provided in said conduit for controlling the admission of the bodies, after their preliminary admixture, into the container 11.

The system 30 for imparting impactive energy to the bodies in the container is made up of a series of spaced plates or horizontal discs 31 made of vibratile material, such as metal or glass. These discs have a diameter slightly less than the inner diameter of the tube 15 to permit their free movement therein and are centrally mounted, together with spacing washers 32, on a movable rod or vertical plunger 34, the lower end portion 35 of which is enlarged and loosely engages the opening 19, the whole series of discs and spacers being rigidly supported between two clamping collars 36 and 37. The discs 31 are mounted on the plunger rod 34 and are spaced apart by the spacing washers 32 as shown in Fig. 17 of the drawings. As will be seen, the plunger 34 at its lower extremity normally abuts the upper end of the drain-cock 17, and, as best shown in Fig. 4, its lower portion 35 is formed with radial inlets 39 and a central opening 40 communicating therewith to provide an exit passage for the treated bodies when withdrawing them from the container 11 through the drain-cock 17. Suitable perforations are formed through the discs 31 to facilitate fluid circulation in the container 11, two possible forms of opening, namely, round and square, being shown in Figs. 5 and 6, respectively. A compression spring 41 is fitted over the plunger portion 35 between cap 16 and collar 36.

The electromagnet 42 which serves with the armature 43 to impart energy through the system 30, is conveniently mounted on a platform 44 in the rear of the panel 12, it being provided with terminals 45 for connection to a suitable source of alternating current (not shown). The armature 43 is juxtaposed to the electromagnet core 46 on an arm 47 pivotally connected to a bracket 48 secured to the panel 12. The arm 47 extends through an opening 49 in the panel and is pivotally connected to another bracket 50 to which the upper end of the plunger 34 is rigidly secured, it being noted that the pivotal connection between the arm 47 and the bracket 50 is such as to preclude or substantially preclude any lost motion. A tension spring 51 is connected between the outer end of the arm 47 and a tension-adjusting screw 52 carried by a bracket 54 secured to the panel 12, a nut 55 being provided on the screw to lock it in any position of adjustment.

It is apparent that any impactive force applied to the armature 43 will be transmitted to the system 30 in the container 11. That is, these parts are conjointly movable because of their mutual connection with the pivotal arm 47. It is also apparent that the respective actions of the two springs 41 and 51 are opposite to one another. That is, the compression spring 41 tends to produce upward movement of the system 30 and downward movement of the armature 43 and the tension spring 51 tends to produce downward movement of the system 30 and upward movement of the armature 43. Now the spring 51 is of greater strength than the spring 41 so that, with no current flowing in the electromagnet 42, the plunger 34 is caused to contact at its lower end 35 with the drain-cock 17 acting as a stop, and, for this position of the plunger, the armature 43 is spaced from the core 46. Upon energization of the electromagnet, the armature 43 is pulled downward against the force of the spring 51 and the tension of the latter is then adjusted, by means of the set screw 52, to cause periodic impacts of desired intensity to take place between the members 43 and 46. During operation, the plunger 34 does not come in contact with the drain-cock 17 because of the inertia of the treated bodies and their damping effect on the elements 31.

It has been found that in some cases heating the bodies while they undergo treatment assists the dispersion contemplated. Thus, a coil 56, having terminals 57 for connection to the source of current, surrounds the container 11 and is supported in this position in any suitable manner as by bolting it to the panel 12 as illustrated, collars 59 providing a spacing between coil and panel. It is understood, of course, that the coil 56 is designed to provide moderate heat only. That is, the temperature in the container 11 should not be raised to the point where vaporization of either of the components or phases undergoing treatment will be caused.

The apparatus shown in Figs. 8 and 9 is essentially the same as that of Figs. 2 and 3, but in addition comprises means for simultaneously oscillating and rotating the container 11. Thus the bottom piece 16 is formed on its bottom surface with peripheral teeth 60 meshing with an elliptical gear 61, which is rotated through a suitable speed-reducing gearing mechanism 62 by a motor 64 fixed to the base 14, the container 11 being guided for oscillatory and rotary movement by annular elements or collars 65 having lateral extensions 66 by means of which they may be bolted to the panel 12. In this manner increased agitation of the bodies in the container 11 is obtained, which permits the treatment to take effect on a more even distribution of inner phase, as well as on an increased amount of inner phase in suspension. Further, the renewing of the surface of contact between the bodies and the elements 31 is more rapid and more effectively executed as well.

By means of the apparatus shown in Fig. 10, the treatment may be carried out under pressure, this also having been found, in some instances, to assist the dispersion. A flexible diaphragm 70 is interposed between the pipe 15 and a cap 71 screw-threaded to the pipe at its upper end, a packing 72 being provided to prevent pressure release during operation. The plunger 34 extends through the diaphragm 70, but has an air-tight connection therewith. The bodies to undergo treatment are introduced through a nipple 74 screw-threaded into the wall 15, which nipple 74 is provided with a valve 75 which is closed after introduction of said bodies. Suitable air pressure is then applied through a nipple 76 also screw-threaded into the wall 15, which nipple 76 is also provided with a valve 77, subsequent closure of which prevents release of the applied pressure. To off-set the effect of pressure on the diaphragm 70, a spring 79 is interposed between said diaphragm and an upper cap 80 screw-threaded to the cap 71. As in Figs. 8 and 9, means are provided for rotating and oscillating the container 11, it being understood that the bodies to undergo treatment and the air-pressure are supplied to the nipples 74 and 76 through flexible conduits (not shown), which are detached from said nipples prior to imparting motion to the container. Here the peripheral teeth 60 formed on the bottom piece 16 mesh with a gear 81 which is so constructed that the oscillatory movement of the container is caused to take place intermittently. Referring to Fig. 11, the major portion 82 of the gear 81 follows a circular pitch-line, while the remaining portion 84 follows a pitch-line within the circle 85 drawn through the pitch-line of the portion 82, it being particularly noted that by this construction the container is held in an uppermost position for a predetermined period of time whereupon it is lowered and raised back to its uppermost position. The plunger 34 here moves with the container 11, which necessitates a modified construction for transferring through said plunger the impactive energy required for treatment of the bodies in the container. Thus, the plunger 34 is secured at its upper end to a block 86 having a rounded surface adapted to rotatably engage a depression 87 in the pivotal arm 89 when the apparatus is in operation and the container 11 is in its uppermost position, the armature 90 carried by the pivotal arm being here attracted upwardly by the electromagnet 91 against the force of the tension spring 92. A stop 93 determines the normal position of the arm 89, a set screw 94 being as before provided for adjusting the tension of the spring 92. Before energizing the electromagnet 91, the container 11 is raised, if necessary, to its uppermost position and in this position its rotation is stopped. Alternating current is then passed through the electromagnet 91 and by proper adjustment of the screw 94 successive impacts are caused to take place between the armature 90 and the electromagnet core 95. As long as the container 11 is caused to remain stationary in its uppermost position, the plunger block 86 contacts at any instant with the arm 89, so that impactive energy is continuously communicated through the plunger and discs 31 mounted thereon to the bodies in the container. With the motor 64 running, however, the motion of the container 11 causes the plunger block 86 to move in and out of contact with the arm 89, so that impactive treatment is effected intermittently. The container 11 is rotated continuously, impactive treatment being effected during the periods that the plunger block 86 rotatably engages the arm 89 and oscillatory movement of the container being effected during the shorter interval that the plunger block 86 is out of contact with the arm 89. It should be observed that, in view of the resilience of the diaphragm 70, there is relative movement between the elements 31 and the container 11 each time the block 86 moves either in or out of contact with the arm 89, because of which renewal of the surface of contact between bodies and elements 31 is more effectively executed. Observing that the boiling points of liquids increase with increasing pressure applied thereon, the apparatus of Fig. 10 provides the further advantage that higher temperatures may be employed.

The period of time required for effecting dispersion in either of the apparatus embodiments which have been described depends on such factors as the nature of the bodies treated, the amount of inner phase or inner phases to be dispersed and the contemplated stability of the dispersion. Thus, a period of, say, 5 to 15 minutes may be found sufficient for some suspensions, while a period of 1 hour or more may be required for others. A procedure which has been found effective in facilitating dispersion is to add the substance or substances to be dispersed gradually as the impactive treatment progresses. In some instances, however, the bodies may be treated in a continuous flow through the container 11. That is, the bodies may be continuously fed to the container 11 and continuously discharged therefrom.

The suspensions produced by the apparatus which has been described have important properties, which will now be described in connection with the following examples of commercial products obtainable.

*Example 1*

Since many impurities and subdivided matter can at times have some emulsifying effect, it is desirable in demonstrating the effectiveness with which dispersion takes place in accordance with my invention to have all apparatus which is employed chemically clean. When this has been accomplished, a predetermined quantity of distilled water is poured into the container 24 (Fig. 7) and a quantity of purified white mineral oil equal to 1% by volume of the water used is slowly introduced as agitation proceeds. In about 5 minutes the oil will have been sufficiently dispersed to enable the impactive treatment to be effective. The material is then permitted to run into the container 11 of, say, Figs. 2 and 3, wherein it is treated for a period of 10 to 20 minutes. If desired, the material may be slightly heated during this treatment. The material is then withdrawn from the container 11 and again agitated for about 5 minutes in the container 24 with another 1% of the same oil, whereupon the resulting material is subjected to impactive treatment for another period of 10 to 20 minutes, heat being again employed if desired. This procedure is repeated, each time adding a small quantity of the same oil, until approximately 5% of oil has been added to the water phase and treated therewith. The material may then be introduced through the drain-cock 17 into the separatory funnel 100 shown in Fig. 12 and after a standing period of 1 to 2 days therein it will be found to have the appearance illustrated. Zone 101 is an upper layer of free oil which may represent from 10 to 20% of the total amount of oil used, zone 102 is a creamy layer of fine particles of oil suspended in water, and zone 103 is a permanent colloidal solution of oil in water. There is no clear water zone. An analysis of the material of any zone will show no chemical change has taken place (for certain oils oxidation may take place, but with mineral oil this is negligible). A quantitative determination of the material of zone 103 will show about two percent of oil in suspension. The material of zone 102 consists mainly of particles somewhat larger than in the colloidal material of zone 103, but both the material of zone 102 and the material of zone 103 are capable of dilution in aqueous media. The material of zone 102, if collected, also constitutes a valuable product since it assays 60 to 70% oil. Its stability can be increased by the addition of a protective colloid or by the addition of almost any substance which will reduce the surface tension of the water phase. Any substance which will increase the hydroxyl-ion concentration will likewise restrain aggregation. As an example of stabilization by the protective colloid method, addition of a solution of gum acacia to cause the material of zone 102 to contain 0.02% of said gum will stabilize said material for a period of six months or more. As an example of stabilization by reduction of surface tension, addition of 5 parts of a 5% soap solution to 95 parts of said material will provide stability for at least the same period. As an example of stabilization by increase of the hydroxyl-ion concentration, addition of ammonium hydroxide to produce a pH of 7.15 will again provide stability for at least the same period. In its stabilized state, the material of zone 102 is still capable of dilution in aqueous media, this being due to the very small quantity of protective colloid or other agent necessary to increase its stability, but also due to the fact that its oil particles are close to colloidal size (its period of stability without stabilizing agents therein is two weeks or more). The free oil in zone 101 represents the agglomeration of particles which have not been sufficiently comminuted by the impactive treatment. It should be observed that there is a certain amount of oil which clings to certain parts of the apparatus from which no impactive energy is transmitted, thus constituting free or untreated material.

The colloidal character of the suspensions produced by the apparatus of this invention may be readily appreciated by comparison with the totally different results obtained by standing of mixtures produced by ordinary means in the absence of protective colloids. The following test has been made with this comparison in view.

*Comparative test*

The identical procedure given in Example 1 is repeated, except that here a colloid mill of the type employing both high shearing stress and high beating action is employed instead of the apparatus of the present invention. That is, purified white mineral oil and distilled water are alternately agitated and treated in such mill for the same periods of time, the amount of oil being as before gradually increased until an approximate oil concentration of 5% is reached. For a true comparison with the material obtained in Example 1, no protective colloid or third substance should be employed and as before all apparatus should be chemically clean. Fig. 13 illustrates the appearance of the final mixture obtained in this manner after a standing period of 1 to 2 days in the separatory funnel 104. Zone 105 is as before free oil, but here represents perhaps 99% of the total amount employed; zone 106 is cloudy with minute water drops suspended in oil; zone 107 is also cloudy, but with minute oil drops suspended in water; and zone 108 is clear water. Neither the material of zone 106 nor the material of zone 107 is of a colloidal character. That is, the oil droplets in zone 107 agglomerate and rise through the zone 106 into the free oil zone 105, whereas the water droplets in zone 106 agglomerate and sink through the zone 107 into the free water zone 108. After a further standing period of a day or so, both zone 106 and zone 107 will disappear. That is, the oil and water phases will then be in the same condition as they were prior to admixture.

The oil-in-water suspensions obtained by the apparatus of the invention may be further concentrated by distillation under reduced pressure. For example, vacuum distillation of the colloidal solution of mineral oil in water obtained in Example 1 (zone 103) has in actual practice yielded concentrates of 3.6% oil content. It should be observed that this figure was attained with a pH of 7.0 and with no efforts to achieve purity as, for example, by dialysis. Much higher concentrations are obtainable where oils or substances of an oily character possess solubility in water to some slight degree. Also the addition of an alkaline substance will increase the ratio of hydroxyl ions which, when adsorbed by the oil particles, permit still higher concentrations to be obtained.

*Example 2*

Three parts of cod liver oil, which may have been treated to have a high vitamin content, and 100 parts of distilled water are agitated in the container 24 for about 5 minutes, whereupon the mixture is subjected to impactive treatment, as by the apparatus of Figs. 8 and 9, for about 15 minutes. The treated mixture is then drawn off and again agitated for about 5 minutes in the container 24 with 3 more parts of the same oil, whereupon the resulting mixture is subjected to impactive treatment for a further period of about 15 minutes. This procedure is repeated, each time adding 3 more parts of the same oil, until 18 quarts in all have been added to the water phase and treated therewith. The material withdrawn after the last treatment in the container 11 is allowed to stand for about 2 days during which the three zones shown in Fig. 12 will have formed. The suspensions corresponding to the zones 102 and 103 are then separately collected. The creamy layer corresponding to zone 102 contains about 66% oil and does not show any sign of breaking down for a period of at least two weeks. It may, of course, be permanently stabilized by addition of a protective colloid and, in this state, it is still capable of dilution in water. The suspension corresponding to zone 103 contains about 2% of oil in permanent dispersion.

Attempts have been made to introduce cod liver oil concentrates into milk by the homogenizer. Milk contains casein and albumen as protective colloids, but in actual practice the mixtures obtained in this manner have not been homogeneous to the extent that is desired. Now either one of the cod liver oil suspensions obtained in Example 2, i. e., either the colloidal solution corresponding to zone 103 or the suspension corresponding to zone 102, may be simply added to the milk or, in fact, to any aqueous food stuff, with satisfactory homogeneity of the final products.

In preparing oil-in-water suspensions of the form of zone 102, their stability may be considerably increased if there is added to the oil phase, prior to its dispersion in the water phase, a substance which is soluble in the oil and of a specific gravity higher than the oil. Substances such as lecithin have been found admirably suited for this purpose. These substances, in addition to weighting down the oil, also function as antioxidants.

*Example 3*

One part of lecithin is added to 99 parts of cod liver oil, which may have been treated to have a high vitamin content. The resulting mixture may then be treated with distilled water in accordance with the procedure given in Example 2. The creamy layer (zone 102) obtained in this manner shows no sign of breaking down whatever and a chemical analysis after weeks of standing and exposure to light will show no oxidation of the oil. Its subsequent addition to milk constitutes a very valuable product.

*Example 4*

An essential oil is dispersed in distilled water by the practice of this invention and the colloidal solution thus obtained (zone 103) is then vacuum distilled. The distillate, while apparently clear to the eye, contains in colloidal solution an amount of oil which renders it suitable for the preparation of toilet water, hand lotions, hair tonics and the like. The main advantage here is the avoidance of the use of alcohol which is considered deleterious in its effect upon the skin and scalp. Economy in cost of preparation is another advantage. The residue from distillation is also a valuable product containing in permanent suspension a higher percentage of the essential oil than the transparent solution obtained as a distillate. This residue may be used without further treatment. Both the distillate and the residue, as well as products derived therefrom, are soluble in water.

*Example 5*

Water, as the inner phase, is temporarily suspended in gasoline by agitation and the temporary mixture thus formed is subjected to impactive treatment in accordance with this invention. The treated material is then drawn off and centrifuged or permitted to stand until all excess water has settled out. The colloidal solution thus obtained is an excellent fuel for internal combustion engines. Increases in effective power delivery up to 40% have been recorded.

*Example 6*

An organic material of an oily nature and containing an undesirable coloring substance is suspended in water by the use of an apparatus embodying the invention. Should the materials be too viscous at normal temperature, the treatment may be carried out at the temperatures provided by the heating coil 56, and if necessary under pressure, as by the apparatus of Fig. 10. If the material is still too viscous to suspend, it may be first dissolved in a predetermined amount of neutral solvent. By breaking the suspension thus formed, a great deal of the coloring substance will be precipitated in the aqueous phase and the recovered material, which rises to the top, will be free or substantially free therefrom. That is, the material may be freed, by the procedure given, of decolorizing matter to the extent required for its proper use.

*Example 7*

Some dyestuffs which are insoluble in water, are soluble in oil, but can be made water soluble in accordance with the invention. The oil soluble dye is dissolved or peptized in a suitable oil and the resulting material is in turn suspended in water by the use of an apparatus embodying the invention. A peptizer, such as ammonium oleate, soap, or an adsorptive solid, preferably finely divided, has been helpful in effecting the dispersion during the impactive treatment. At this stage the material should be permitted to age for at least two weeks when the emulsion can be broken. The oil will separate out perfectly clear and the soap or other agent will form another layer. On the other hand, the dyestuff will be mainly suspended in the water. This suspension can be used very advantageously for the dyeing of fabrics and other materials. Should it be low in dyestuff content, it can be concentrated by evaporation of part of the water phase. If an undesirable precipitate has been formed, it can be deflocculated or repeptized by any suitable means or it can be redispersed by the use of an apparatus embodying the invention.

*Example 8*

A colloidal sol of a metal is made by Bredigs arc or by any suitable method and a portion of the water is then evaporated. The concentrated material is in turn suspended in lubricating oil by the use of an apparatus emboying the invention and the suspension is later broken, when it will be found that the metallic particles will have been resuspended in the oil. The latter suspension may be advantageously used as a lubricant for machine bearings, the metallic particles having been found to have either one or the other of two important functions, depending on the orientation of the oil. Either they adsorb to the bearing surfaces and so fill in the microscopic pits and cavities which exist in even the most highly polished surfaces, or act to softly abrade to a still finer degree of smoothness.

Example 9

After the hydrolysis of magnesium hydroxide a given quantity is subjected to impactive treatment in an apparatus embodying the invention. Heat and preliminary agitation, in this instance, are not essential. The improvement in the material as a result of this treatment may be demonstrated by the following comparative tests.

Into the graduate shown in Fig. 14 is poured a sample of the raw material obtained directly by hydrolysis, into the graduate shown in Fig. 15 is poured a sample obtained by treating a given quantity of the raw material in a colloid mill of the type employing both high shearing stress and high beating action, and into the graduate shown in Fig. 16 is poured the sample obtained by treatment in the apparatus of the invention. These three specimens are permitted to stand undisturbed in the graduates for a period of six months when they will present the appearance illustrated in said figures. The untreated product (Fig. 14) shows a sedimentation of 45%, the product treated in the colloid mill (Fig. 15) shows a sedimentation of 82%, and the product treated in the apparatus of the invention (Fig. 16) shows a sedimentation of 91.5%. Conversely stated, the untreated product has precipitated to the extent of showing 55% of its bulk as clear water, the product treated in the colloid mill has precipitated to the extent of showing 18% of its bulk as clear water, and the product treated in the apparatus of the invention has precipitated only to the extent of showing 8.5% of its bulk as clear water. It is of course understood that all three specimens should be of equal ratio of solid to liquid. Slight shaking will redisperse the magnesium hydroxide particles of each of the three specimens, but again the untreated product (Fig. 14) and the product treated in the colloid mill (Fig. 15) will precipitate out much sooner than the product treated in the apparatus of the invention (Fig. 16). In this connection is to be particularly noted that the total sedimentations illustrated occur after a standing period of one or two days in the case of the untreated product (Fig. 14), after a standing period of two to three weeks in the case of the product treated in the colloid mill (Fig. 15), and after a standing period of about six months in the case of the product treated in the apparatus of the invention (Fig. 16).

Example 10

A given quantity of sulphur is pulverized or ground to fineness, and is then added to pure water and agitated. A little soap may be added to wet the particles down, although this is not absolutely essential. The coarse suspension thus formed is subjected to impactive treatment in an apparatus embodying the invention and, after an appreciable period of standing of the treated material, a white precipitate will be found covering the layer of coarse yellow particles. This precipitate may be called "colloidal" sulphur in accordance with trade usage of such term and is a product superior in many respects to corresponding products now obtainable. In the usual manner, the larger particles of this new product may be separated out by elutriation and the finer material thereafter concentrated by evaporation. Proper peptizing agents may also be added to promote dispersion.

Example 11

A sample of raw distillate of an alcoholic beverage is subjected to impactive treatment in an apparatus embodying the invention, preferably at slightly raised temperature and with applied pressure to prevent evaporation. Subsequent agitation in the presence of an adsorptive agent such as charcoal and filtration will yield a beverage in which a noted increase of esterification will be found upon analysis. Taste and bouquet will likewise be improved.

It is desired to have it understood that the invention is not limited to the embodiments illustrated and described herein and that these may be modified in many ways without departing from the spirit of the invention.

What is claimed is:

1. An apparatus for dispersing matter in an outer liquid, comprising a closed container for holding the bodies to undergo treatment, said container being adapted to have pressure introduced therein, vibrating elements disposed in said container and adapted to be submerged by said bodies, and means for alternately oscillating said container and communicating impactive energy through said elements to said bodies.

2. An apparatus for dispersing matter in an outer liquid, comprising a container for holding the bodies to undergo treatment, a plurality of axially aligned vibrating elements disposed in close juxtaposition in said container and adapted to be submerged by said bodies, an iron-core electromagnet adapted for connection to an alternating-current source, an armature movable in and out of contact with said electromagnet, said elements being in mechanical connection and movable with said armature to transmit an impacting force to said elements, and adjustable resilient means opposing magnetic attraction of said armature.

3. An apparatus for dispersing matter in an outer liquid, comprising a container for holding the bodies to undergo treatment, a system of spaced vibrating elements disposed in said container and adapted to be submerged by said bodies, two members movable in and out of contact with one another, said system being mechanically connected with one of said members, means for producing periodic impacts between said members, and means for rotating and oscillating said container.

4. An apparatus for dispersing matter in an outer liquid, comprising a closed container for holding the bodies to undergo treatment, said container being adapted to have pressure introduced therein, a system of vibrating elements disposed in said container and adapted to be submerged by said bodies, two members movable in and out of contact with one another, means for continuously rotating and intermittently oscillating said container, said system being in mechanical connection with one of said members during the periods of time that said container is not in oscillatory motion, and means for producing periodic impacts between said members.

5. An apparatus for dispersing matter in an outer liquid, comprising a vertical container for holding the bodies to undergo treatment, a vertical plunger and a series of spaced horizontal vibrating elements mounted thereon, said plunger and elements being disposed in said container and adapted to be submerged by said bodies, two members one of which is movable in and out of contact with the other, said plunger and elements being mechanically connected and movable with the movable member, means for producing periodic impacts between said members, said plunger at its lower end loosely engaging an opening through said container, and means for withdrawing said bodies through said opening.

6. In a device of the class described, a container for liquid, a columnar member comprising a series of closely spaced partitions secured upon a support, said columnar member being mounted for movement within said container, and means to rapidly pound said columnar member to cause said partitions to present a large vibrating area to the liquid within said container.

7. In a device of the class described, a container for liquid, a columnar shock transmitting member comprising a series of closely spaced partitions extending across said container, said partitions being in close proximity one to another to substantially form a plurality of small chambers within said container, said columnar member being mounted for movement within said container, and hammer means to impart rapid recurring shocks to said columnar member to impart rapid impacts to the liquid within said small chambers.

8. A device of the class described, a container for liquid, foraminous partitions arranged in close juxtaposition and extending across said container and dividing the container into a plurality of small localized compartments, and means to transmit rapidly recurring impacts to said foraminous partitions to transmit impacts to the liquid within said localized compartments.

9. A device of the class described comprising a container for a liquid, and hammer means to transmit rapidly recurring impacts simultaneously to a plurality of localized small volumes of a liquid within said container.

10. In a device of the class described, a container for liquid, a series of closely spaced partitions extending across said container to divide the container chamber into a series of small unit chambers, means to rapidly move said partitions to and fro to cause the liquid in the small unit chambers to partake of the movement of said partitions, and means to suddenly arrest the movement of said partitions at the end of a cycle of each to and fro movement to cause the moving liquid in each small unit chamber to impinge against an adjacent partition and thereby simultaneously produce a multiple of water-hammer effects in the liquid within the said container.

11. An apparatus for dispersing matter in an outer liquid, comprising a tubular container having rigid side walls for holding the bodies to undergo treatment, plate-like vibrating elements arranged in close juxtaposition and disposed transversely of said container and adapted to be completely submerged by said bodies, and means for communicating impactive energy to said bodies by rapidly vibrating said plate-like elements.

12. An apparatus for dispersing matter in an outer liquid, comprising a vertical tubular container for holding the bodies to undergo treatment, spaced apart discs arranged in close juxtaposition and disposed transversely of said container and adapted to be submerged in said liquid, and pounding means for communicating impactive energy to said discs to vibrate the same rapidly.

13. An apparatus for dispersing matter in an outer liquid comprising an elongated vertical container for holding the bodies to undergo treatment, a series of spaced horizontal vibrating elements arranged in close juxtaposition and disposed in said container and adapted to be submerged by said liquid, and pounding means adapted to be mechanically effective to impart impactive energy to rapidly vibrate said elements.

SAMUEL JOSEPH WYNN.